United States Patent

Niot et al.

Patent Number: 6,028,849
Date of Patent: Feb. 22, 2000

[54] COMMUNICATION TIMING CONTROL ARRANGEMENT AND METHOD THEREOF

[75] Inventors: Francois Niot, Biot; Roland Van Der Tuijn, Mougins, both of France

[73] Assignee: VLSI Technology, Inc., San Jose, Calif.

[21] Appl. No.: 08/844,266

[22] Filed: Apr. 18, 1997

[51] Int. Cl.[7] .................... H04J 3/00; H04J 3/06; H04B 7/212

[52] U.S. Cl. ............... 370/280; 370/347; 370/350; 370/509; 455/343

[58] Field of Search .................. 370/277, 280, 370/318, 336, 337, 345, 350, 509, 514, 347, 311; 455/38.3, 343, 502, 574

[56] References Cited

U.S. PATENT DOCUMENTS

| | | | |
|---|---|---|---|
| 4,577,315 | 3/1986 | Otsuka | 370/311 |
| 5,384,564 | 1/1995 | Wycoff | 340/825.44 |
| 5,781,156 | 7/1998 | Krasner | 342/357 |
| 5,790,939 | 8/1998 | Malcolm | 455/13.2 |

OTHER PUBLICATIONS

VLSI Technology Communication Products Group, Application Note, "DECT VP23001 Handset Processor Radio Interface", Version 1.10, Feb. 1996, pp. 1–30.

Sierra Semiconductor Corporation, "SC14400 DECT Terminal Processor", Rev. 1.0, Sep. 1993.

Phillips Electronics B.V., "DECT Burst Mode Controller PCD5042 Product Specification", Nov. 1994, pp. 1–69.

Paul Walter Baier et al., "Taking the Challenge of Multiple Access for Third–Generation Cellular Mobile Radio Systems—A European View", http://www.ieee.org/comsoc/jung.html, pp. 1–15 (First published in *IEEE Communications Magazine*, Feb. 1996, vol. 34, No. 2).

"FREESET: Ericsson's Business Cordless Telephone System", http://www/ericsson.se/EPI/BZ/kap4.html, pp. 1–7.

*Primary Examiner*—Chau Nguyen
*Assistant Examiner*—Seema S. Rao

[57] ABSTRACT

A radio controller arrangement for controlling communication signal timing in a duplex radio-frequency TDMA radio includes a TDMA timer that generates a receive timing signal and a microprocessor circuit. The microprocessor circuit commands the TDMA timer to activate the radio to receive a signal and converts the signal into packets having synchronization and data fields. The TDMA timer synchronizes a beginning of a data collection operation to the synchronization field and locates the beginning of the data field based on the end of the synchronization field. The TDMA timer collects data from the data field until it detects the end of the data field. The TDMA timer then commands deactivation of the radio. The radio controller arrangement may be incorporated into a communication device or used in connection with a method for controlling communication signal timing.

23 Claims, 7 Drawing Sheets

COMMUNICATION TIMING CONTROL ARRANGEMENT AND METHOD THEREOF

FIELD OF THE INVENTION

The present invention relates to communication systems. More particularly, the present invention relates to an arrangement and method for controlling timing of signals in radio-based communications.

BACKGROUND OF THE INVENTION

Wireless communications systems have become a widespread approach to communicating speech and data. Many types of devices, such as pagers and cellular phones, use wireless communications to increase their mobility. Various standards or protocols have been developed to provide a wide variety of services and to satisfy the needs of consumers. One such standard, known as the Digital European Cordless Telecommunications (DECT) standard, provides access to a variety of networks, e.g., Global System for Mobile Communications (GSM), Integrated Services Digital Network (ISDN), and Public Switched Telephone Network (PSTN) through standards known as DECT profiles.

Users within a DECT system share a band on the frequency spectrum. With the users sharing a frequency band, DECT systems transmit speech and data using approaches collectively known as time division multiple access (TDMA). In TDMA, communication time is divided into time intervals known as frames. The DECT standard, for example, defines frames as 10 millisecond intervals. Each frame is further divided into divisions known as slots. Speech and data from each user are stored and compressed as data packets. The system transmits data packets during selected slots. Each device in a DECT system is assigned one or more slots identifying the device as the source of data packets transmitted during the assigned slots.

Many TDMA systems are susceptible to delays that potentially result in lost data or incorrect identification of sources of data packets. Such delays are attributable to, for example, the distance between a handset or mobile station and its corresponding base station. These delays typically vary between individual devices within a cell, rendering synchronization of the devices difficult.

Some TDMA approaches switch data packets at fixed time intervals after receiving the beginning of a data packet in order to compensate for communication delays. The fixed interval includes some allowance for delays. In certain applications, the delays can exceed this allowance. When the delay exceeds the allowance, data packets may be truncated prematurely, resulting in lost data.

Certain other TMDA techniques use software to measure the amount of delay in receiving data from the base station. Such software techniques compensate for delays by commanding the radio controller to deactivate the radio at a later time, e.g., one or two bits later. With software compensating for the delays, the software becomes more complex. Moreover, power consumption increases, reducing battery lifetimes.

SUMMARY OF THE INVENTION

According to one embodiment, the present invention is directed to a radio controller arrangement for controlling communication signal timing for use in a duplex radio-frequency TDMA radio having receive signals communicated in contiguously arranged packets. The radio controller arrangement includes: a TDMA timer that generates a receive timing signal, a radio-frequency receiver, and a microprocessor circuit. The microprocessor circuit includes at least one processor and a program instruction set. When the processor executes the program instruction set, it commands the TDMA timing circuit to activate the radio-frequency receiver. The TDMA timing circuit then synchronizes a beginning of a data collection operation to a synchronization field of a packet received by the radio-frequency receiver. The TDMA timing circuit determines a beginning of a data field of the received packet as a function of an end of the synchronization field, collects data from the data field, and detects the end of the data field. After the TDMA timing circuit detects the end of the data field, it commands deactivation of the radio-frequency receiver. Additional embodiments are directed to a communication device incorporating the radio controller and a microprocessor arrangement for controlling communication signal timing.

According to another embodiment of the present invention, a method is used in controlling communication signal timing in connection with a duplex radio-frequency TDMA radio having receive signals communicated in contiguously arranged packets. The method includes using a TDMA timing circuit to generate a receive timing signal and activating a radio-frequency receiver in response to the receive timing signal. A data collection operation of the TDMA timing circuit is synchronized to a synchronization field of a packet received by the radio-frequency receiver. The method also includes using the TDMA timing circuit to determine a beginning of a data field of the received packet as a function of an end of the synchronization field and to collect data from the data field at least until the end of the data field is detected. After the end of the data field is detected, the TDMA timing circuit commands deactivation of the radio-frequency receiver. Additional claims are directed to radio controller arrangements for implementing this method.

The above summary of the invention is not intended to describe each disclosed embodiment of the present invention. This is the purpose of the figures and of the detailed description that follows.

BRIEF DESCRIPTION OF THE DRAWINGS

Other aspects and advantages of the present invention will become apparent upon reading the following detailed description and upon reference to the drawings in which.

While the invention is amenable to various modifications and alternative forms, specifics thereof have been shown by way of example in drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of systems and arrangements that control the timing of signals in radio-based communications. The invention has been found to be particularly advantageous in application environments using time division multiple access (TDMA) to allow multiple users to share a frequency band. An appreciation of various aspects of the invention is best gained through a discussion of various application examples operating in such an environment.

Figure 1:
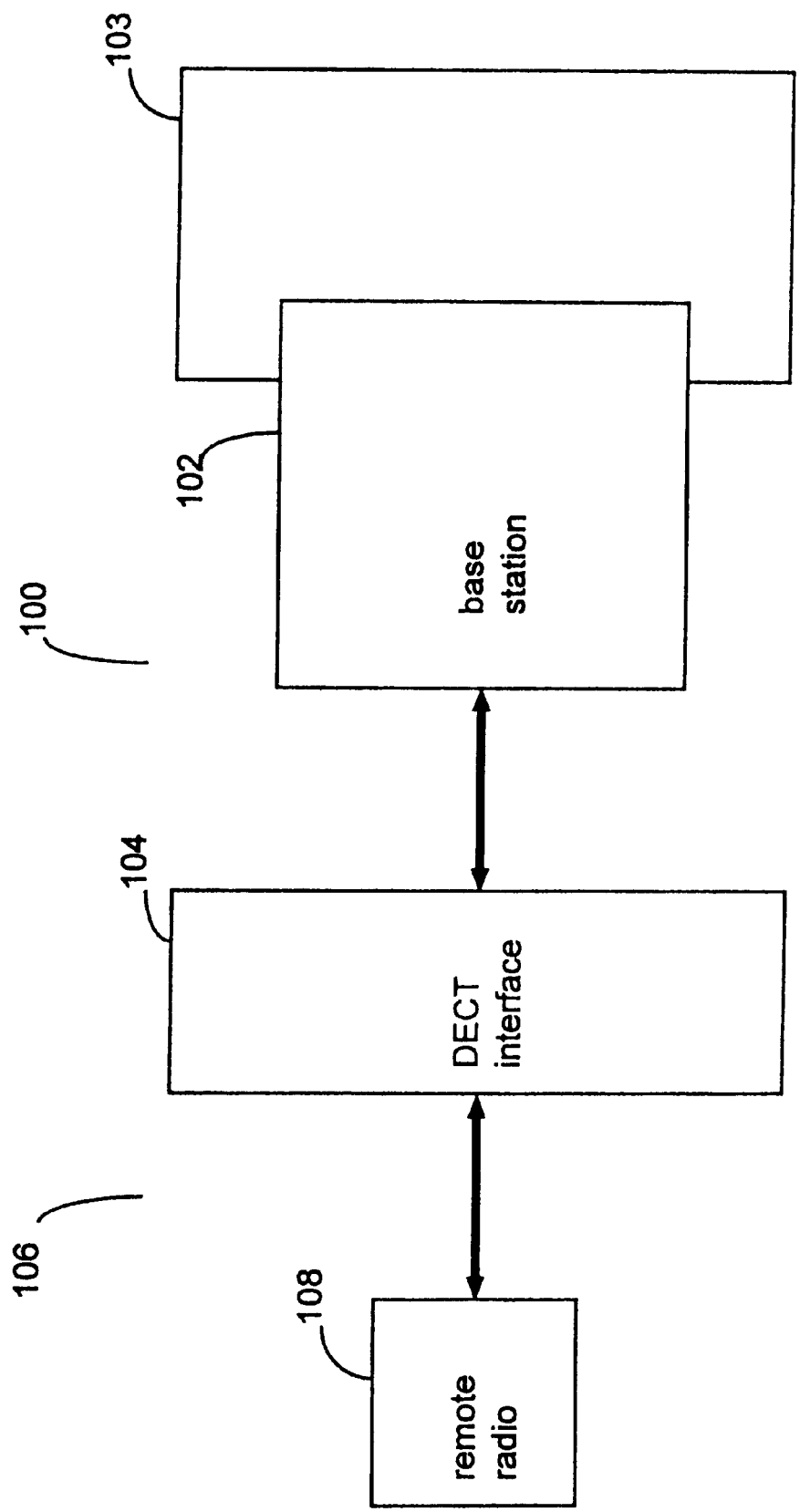
FIG. 1 is a block diagram of a communication system, according to the present invention.

FIG. 1 is a block diagram of a communication system. The communication system includes a fixed part 100 having a base station 102 as part of an overall control center 103. The control center 103 acts as a communication hub between various users within a system and provides access to, for example, a local public network. A DECT interface 104 provides an interface between the fixed part 100 and a remote part 106. The remote part 106 includes a remote radio device 108, such as mobile, portable, and fixed type devices. As an application example, the remote radio 108 may be a cellular phone, a wireless audio/video terminal, a wireless modem, and a pager.

Figure 2:
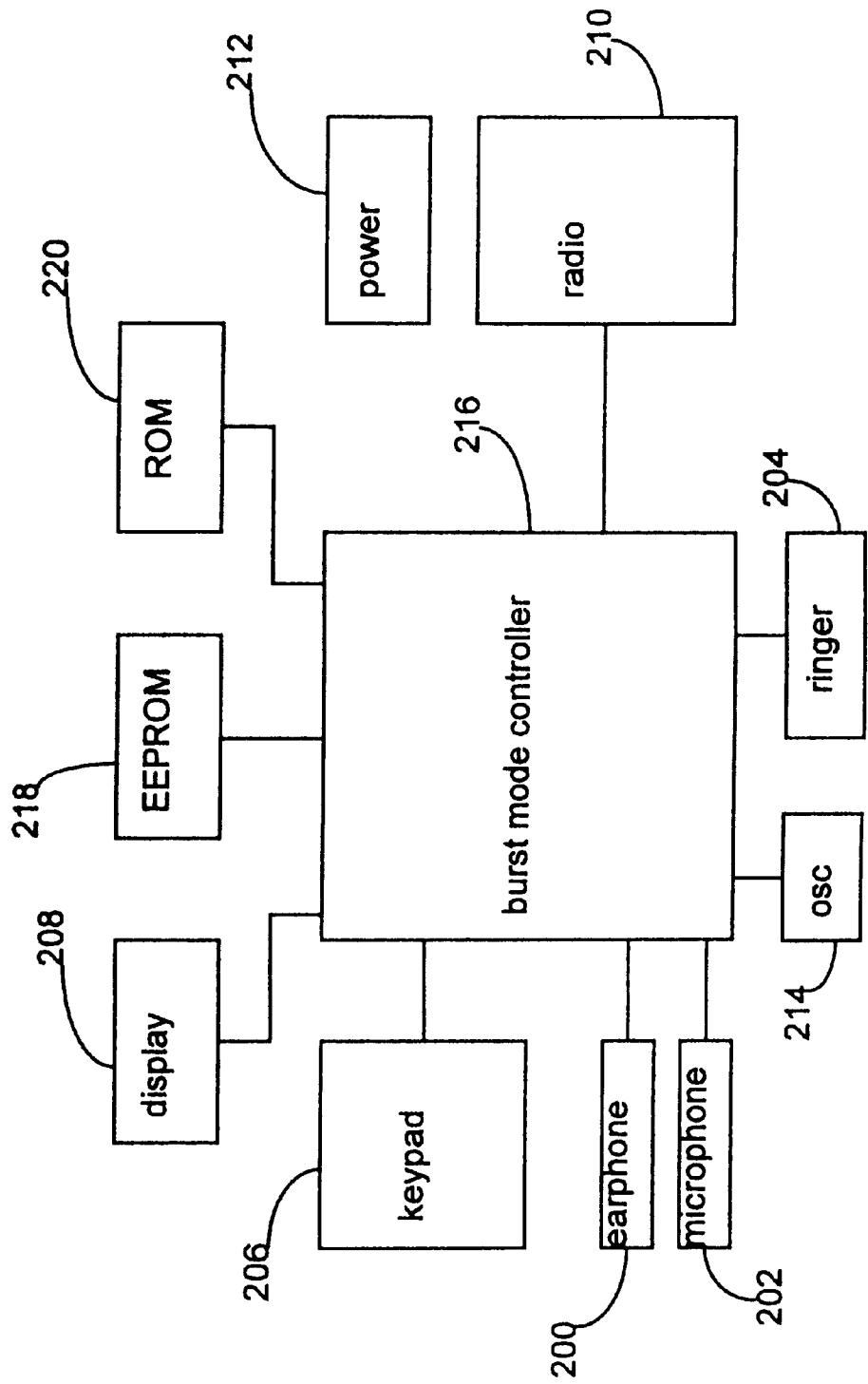
FIG. 2 is a block diagram of a remote radio device that may be used in the system of FIG. 1, according to the present invention.

FIG. 2 illustrates a remote radio device, specifically, a portable communication device, according to the present invention. The portable communication device includes an earphone 200 and a microphone 202 for voice communications between users in a network. A ringer 204 alerts a user to an incoming call. A keypad 206 is used for dialing numbers or placing outgoing calls. A display panel 208 displays the number dialed, as well as other information, such as the duration of a call. The display panel 208 may be implemented using conventional technology. The display panel 208 may also include a backlight or other source of illumination for use in low light conditions. A radio 210 transmits signals to and receives signals from the base station. The radio 210 is powered by a power supply 212 and uses an oscillator 214 to generate radio energy for transmitting signals.

A burst mode controller 216 controls and coordinates the various components of the portable communication device. The burst mode controller 216 uses an EEPROM 218 to drive the display panel 208. A ROM 220 storing program instructions is optionally installed in the portable communication device to allow the user to modify the operation of the burst mode controller 216 for a variety of applications.

Figure 3:
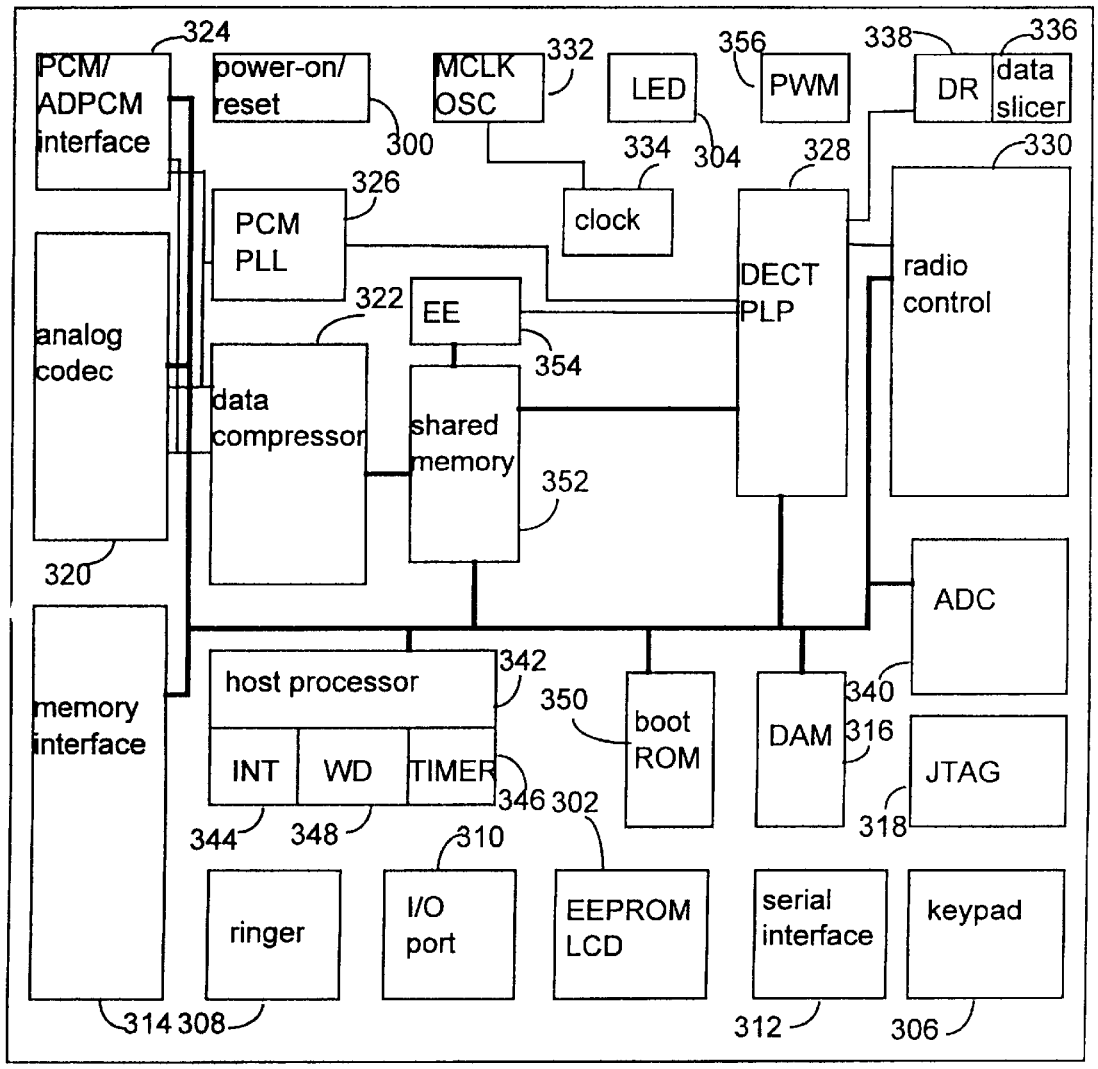
FIG. 3 is a block diagram of a burst mode controller that may be incorporated into the remote radio device of FIG. 2, according to the present invention.

FIG. 3 is a block diagram of an example implementation of a burst mode controller for use in connection with the remote radio device. A power block 300 activates and deactivates the radio controller and resets the radio controller in response to a reset signal. Status indicators, such as a liquid crystal display (LCD) or a light emitting diode (LED) arrangement, are controlled by an LCD control block 302 and a LED control block 304. User input from a keypad is scanned by a keypad scanner 306. A ringer controller 308 drives a ringer that alerts the user to incoming calls. The radio controller may receive additional data for transmission or output received data using an input/output (I/O) port 310 or a serial interface 312. The radio controller can also receive data from an external ROM using a memory interface 314.

Certain components perform support functions in the radio controller. A DECT authentication module (DAM) 316 identifies the portable communication device to insure proper charging and billing for calls. Diagnostic functions are provided by a Joint Test Action Group (JTAG) module 318, which performs conventional boundary scans to detect states of input and output pins.

To transmit speech and other audio information, an analog codec 320 codes the audio information as a data stream according to, for example, the IEEE G711 standard. The data stream is then compressed by a data compressor 322 according to a data compression standard, such as IEEE G721. The data compressor 322 uses pulse code modulation (PCM) or adaptive differential pulse code modulation (ADPCM) to compress the data and communicates with the PCM or the ADPCM using an interface 324. A PCM phase-locked loop (PLL) 326 provides frequency and phase control of the signal to be transmitted.

The compressed data is sent to a DECT physical layer processor (PLP) 328, which formats the data into frames for transmission. According to the DECT standard, each frame is 10 milliseconds long and contains 24 slots. Twelve slots are used for transmitting data, and twelve slots are used for receiving data. Each connection typically uses one transmit slot and one receive slot for each frame; accordingly, the DECT TDMA structure allows twelve simultaneous connections during a single frame. The frames are output for transmission using a radio. The radio is activated and deactivated by a radio control block 330. An oscillator controller 332 controls the oscillator, which generates the radio energy for transmitting a signal. The oscillator controller 332 receives a clock signal from an external clock and sends the clock signal to a clock distributor 334, which distributes the clock signal to various components of the burst mode controller.

The burst mode controller also controls the receiving of data by the communication device. The radio control block 330 activates and deactivates the radio transceiver. A data slicer 336 converts a received signal into a digital signal. The data slicer 336 is implemented using, for example, a conventional one bit analog to digital converter (ADC). In certain applications, the radio controller may use an external slicer instead of the data slicer 336. In such applications, the radio controller disables the data slicer 336. A data recovery module 338 extracts data from the digital signal. An indication of the strength of a received signal is received by an ADC 340. The DECT PLP 328 converts data signals generated by the data recovery module 338 into TDMA structures by extracting packet data from the received data stream. The received packet data is then decompressed by the data compressor 322. The analog codec 320 converts data to an analog signal for output to, for example, an earphone.

Transmission path delays in receiving and transmitting radio signals introduce delays that potentially adversely affect processing of data by the radio controller. TDMA systems rely on time relationships to identify sources of received data. This reliance on timing relationships increases the importance of compensating for delays to avoid loss of data. In order to compensate for delays, a host processor 342 directs the radio control block 330 to activate the radio to adapt to communication delays. The host processor 342 includes a set of interrupts 344 and a timer 346 and uses a watchdog timer 348 for detecting possible malfunctions in the host processor 342. When the host processor 342 is initialized, it retrieves program instructions and other data, such as interrupt vectors, from a boot ROM 350. Data retrieved from the boot ROM 350 configures the host processor 342 to interface with the other components of the radio controller.

A shared memory 352 stores data used by the radio controller. Several components of the radio controller access the shared memory 352, as indicated by the bold lines on FIG. 3. The shared memory 352 can be implemented using, for example, a random access memory (RAM).

In addition to adapting data collection to communication delays, the burst mode controller provides secure communications through encryption. An encryption engine 354 generates a cipher key. The DECT PLP 328 uses the cipher key to encrypt the transmitted packet data and to decrypt the received packet data. The host processor 342 loads bit sequences known as encryption initialization keys into the shared memory 352. The encryption engine generates the cipher key using the encryption initialization key.

A pulse width modulator (PWM) controller 356 provides a variety of support functions in the burst mode controller. For example, the PWM controller 356 is used in controlling the power supply (212 of FIG. 2). In addition, the PWM controller 356 is optionally used to trim the frequency of the oscillator (214 of FIG. 2).

Figure 4:
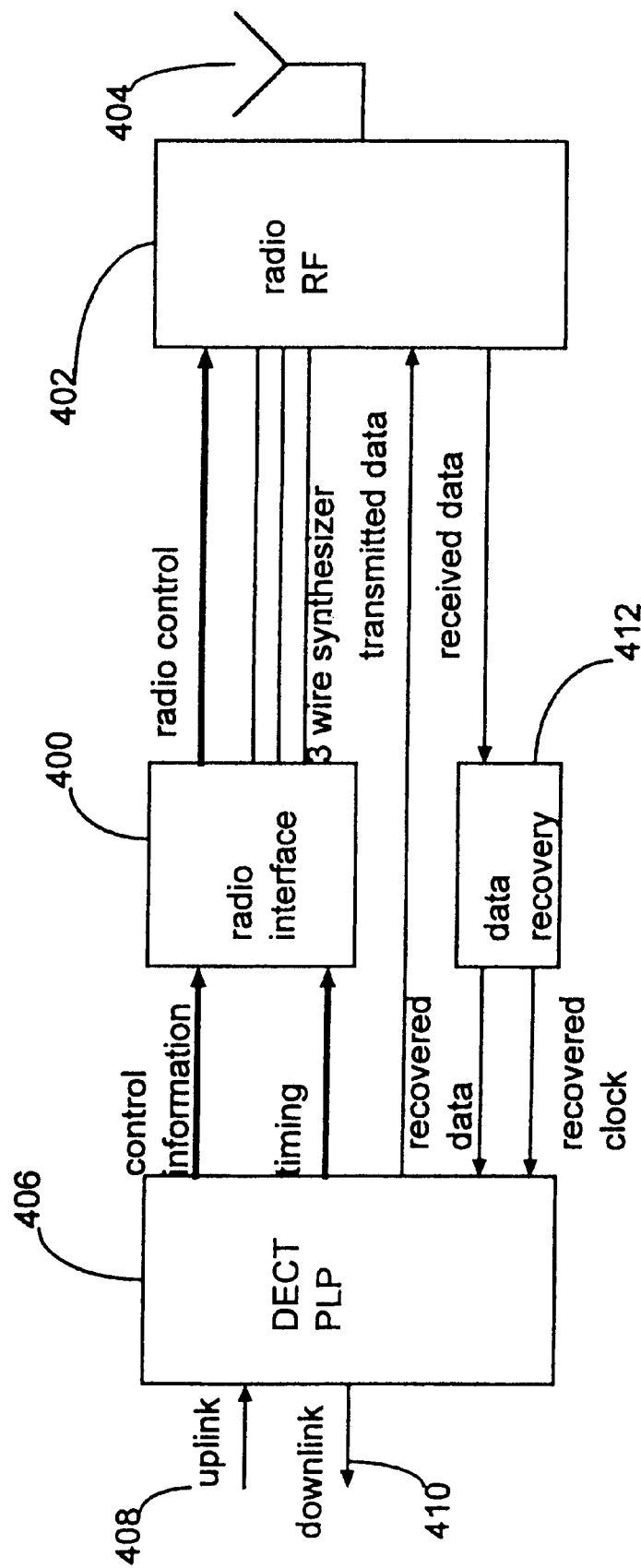
FIG. 4 is a block diagram of a communication system that may form part of the system of FIG. 1, according to the present invention.

FIG. 4 illustrates a radio controller arrangement according to the present invention. A radio interface 400 controls a radio 402 that transmits and receives signals using an antenna 404. In certain application environments in which it is desirable to reduce signal fading, the radio 402 may transmit and receive signals using multiple antennas, switching between antennas to minimize fading. The radio 402 uses one or more synthesizers (not shown) to generate radio signals of various frequencies. The radio interface 400 programs the synthesizers to generate signals of a desired frequency using a three-wire interface. The three-wire interface communicates clock, data, and strobe signals to the synthesizers. Other control signals, for example, activate and deactivate the radio 402 and switch between antennas. The radio interface 400 receives control and timing information from a DECT PLP 406, which communicates information with other components of the radio controller using an uplink 408 and a downlink 410.

Figure 6:
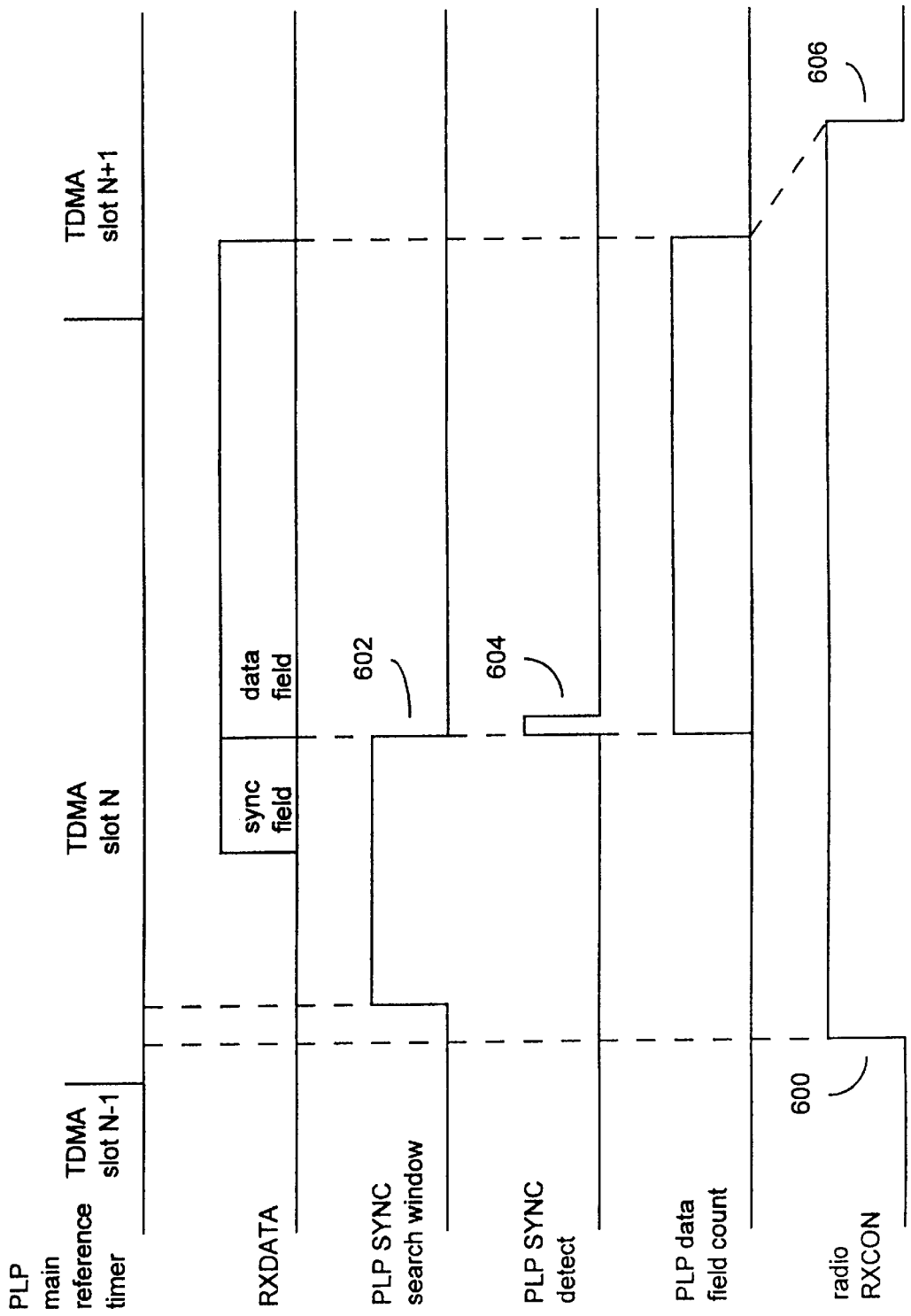
FIG. 6 is a timing diagram indicating timing relationships in a radio receiver of the system of FIG. 1, according to the present invention.

In order to adapt the operation of the radio 402 to varying delays, the DECT PLP 406 activates the radio 402 at a time determined by a PLP reference timer, as indicated by a rising edge 600 of a radio activation signal RXCON depicted at the bottom of FIG. 6. A data recovery module 412 extracts a clock signal and data from the received radio signal and sends the extracted clock signal and data to the DECT PLP 406. Each data packet has a synchronization field that is used for clock and packet synchronization of the radio link. A DECT-compliant synchronization field contains 32 bits. The first 16 bits are a preamble, and the last 16 bits contain synchronization information. The DECT PLP searches for the beginning of the synchronization field during a time window 602 of the trace labeled, "PLP SYNC search window" on FIG. 6. The DECT PLP 406 uses the synchronization information to synchronize the radio 402. Moreover, because the synchronization field has a fixed length, e.g., 32 bits, the DECT PLP 406 can determine the end of the synchronization field based on detection of a 16-bit synchronization information pattern using a synchronization information pattern detector (not shown).

A data field follows the synchronization field. DECT-compliant communication devices use several types of data fields of various lengths and formats to communicate data. With the data field immediately following the synchronization field, the DECT PLP 406 can detect the beginning of the data field based on the end of the synchronization field. For example, when the data field immediately follows the synchronization field, the first bit of the data field immediately follows the last bit of the synchronization field. The signaling portion of the data field identifies the type of the data field and, therefore, its length.

When the DECT PLP 406 detects the beginning of the data field, as indicated by a transient 604 of trace labeled "PLP SYNC detect" on FIG. 6. The DECT PLP 406 collects data from the data field and counts the data from the data field at least until it detects the end of the data field. The end of the data field may be indicated, for example, by the identification of the type of the data field in the signaling portion of the data field. After the DECT PLP 406 detects the end of the data field, the DECT PLP 406 commands the radio 402 to deactivate, as indicated by a falling edge 606 of the signal RXCON. Alternatively, the DECT PLP 406 may command the radio 402 to deactivate some time after it detects the end of the data field. By waiting until it collects all data from the data field before commanding deactivation of the radio 402, the radio controller reduces the risk of losing data. With the risk of data loss reduced, the portable communication device can transmit over extended distances.

Figure 7:
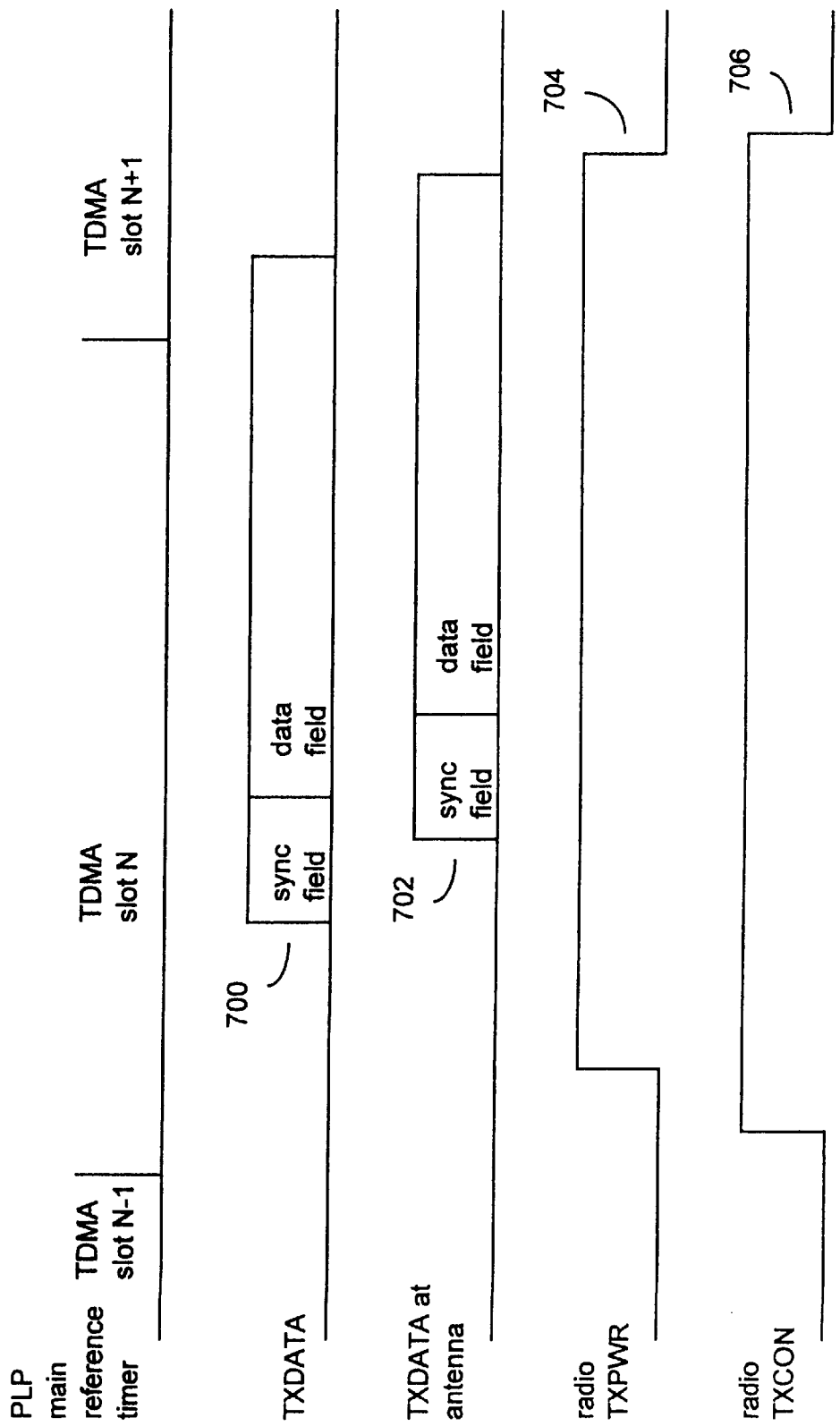
FIG. 7 is a timing diagram illustrating timing relationships in a radio transmitter of the system of FIG. 1, according to the present invention.

Delays also occur in transmitting data using the radio 402. These delays are attributable to, for example, delays in sending data to the radio 402 for transmission. The DECT PLP 406 adapts to variable delays by similarly deactivating the radio 402 only after all the data in a data field for transmission has been transmitted. FIG. 7 illustrates the timing relationships in transmitting data using the radio 402. As indicated by the offset between transmitted data packets 700 and 702, the transmitted data TXDATA is delayed at the antenna 404 of FIG. 4. The transmitted data at the antenna extends into the subsequent TDMA slot N+1. The DECT PLP 406 waits until all of the data in the data field has been transmitted before powering down the radio 402, as indicated by a falling edge 704 of a power signal TXPWR, and deactivating the radio 402, as indicated by a falling edge 706 of a radio activation signal TXCON.

Figure 5:
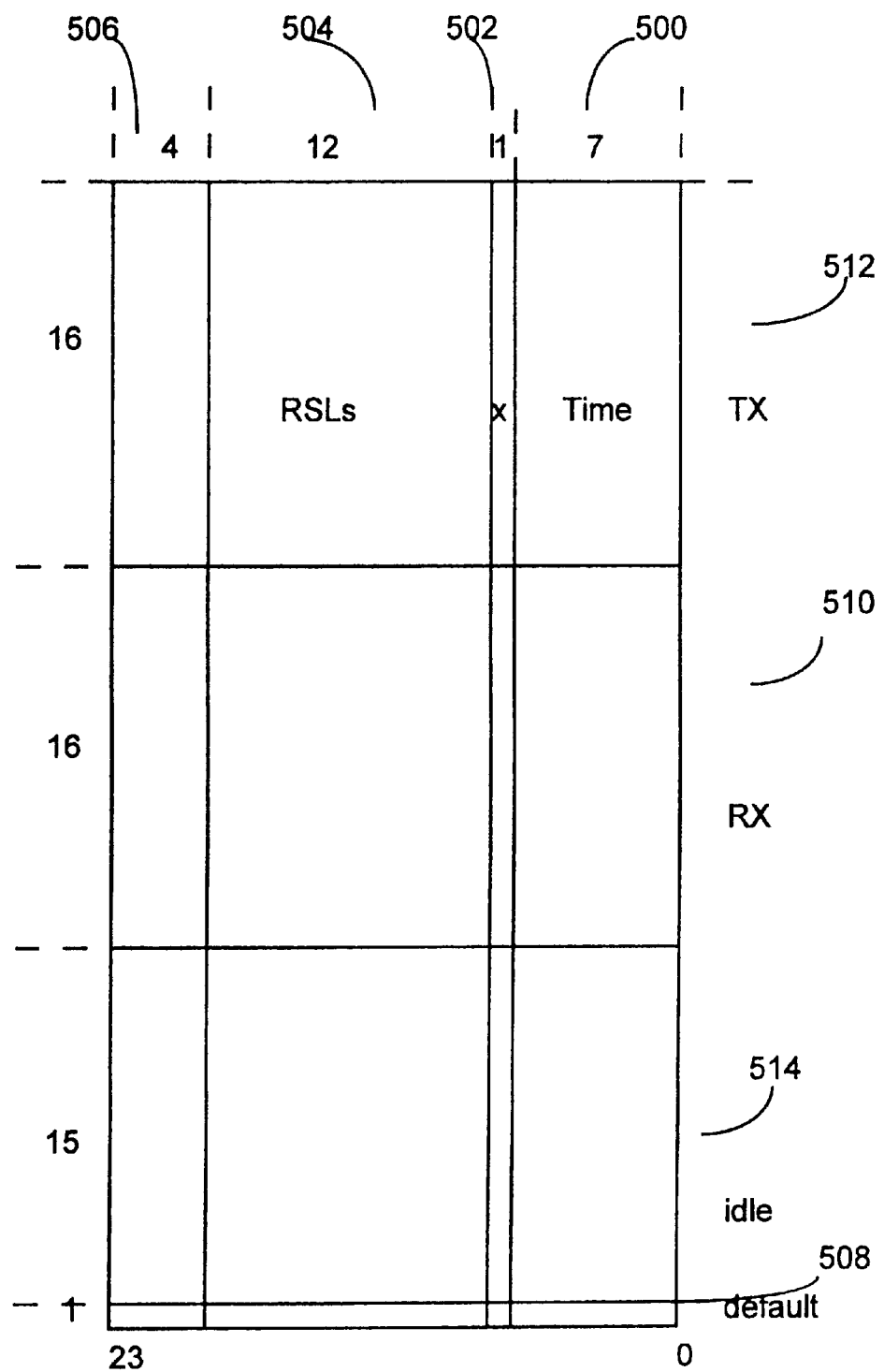
FIG. 5 is a diagram of an example memory configuration for use in the portable communication device of FIG. 2, according to the present invention.

FIG. 5 illustrates an example memory configuration for use in controlling the activation and deactivation of a radio, according to the present invention, the example memory configuration illustrated in FIG. 5 is implemented using a 48 word by 24 bit RAM that is clocked using, for example, the clock 334 of FIG. 3. At each cycle of the clock, each radio signal can be independently set high or low. FIG. 5 depicts the words as rows and bits within each word as columns. Each word is divided into four sections. Seven bits form a time index section 500 that indicates a clock bit number at which the output levels associated with the word should be latched to the outputs. One bit is a last location flag 502 that indicates the last word in a sequence of words. Twelve bits form a radio signal output level section 504, which indicates the output level of each output. The remaining four bits in each data word form a section 506 that is not used.

The address range of the memory configuration illustrated in FIG. 5 is divided into four parts. One word forms a default part 508. When the radio interface is enabled, radio signal output registers, which may be implemented using latching arrangements, are loaded with the value stored in the default part 508. A receive part 510 and a transmit part 512 each consist of sixteen words. The receive part 510 and the transmit part 512 store words known as sequences that are executed by the radio controller. For active slots, the radio controller executes either the received sequence or the transmit sequence, depending on whether data is to be received or transmitted. The sequence starts when the bit number stored in memory matches a bit number from the clock. When these values match, the corresponding radio signal output levels are loaded into the radio signal output registers. Next, the address is incremented and the bit number from the clock is compared to the next bit number stored in the memory. This process repeats until the last location of a sequence is detected using the last location flag 502. The radio signal output registers store radio signal output levels corresponding to the last address until the beginning of an idle sequence, which follows the received sequence or the transmit sequence. The receive and transmit sequences can switch radio signals at sixteen instances within a DECT slot.

The idle sequence begins when the DECT PLP detects the end of the data packet. The idle sequence bit number stored in an idle part 514 of the memory is compared with a number stored in an internal idle counter. The idle counter begins counting from zero when the DECT PLP clocks the last data packet and stops when the last word in the idle sequence is detected using the last location flag 502. The idle sequence can switch radio signals at sixteen instances within a 64 bit time period immediately following the last bit of the data packet.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims.

What is claimed is:

1. For use in a duplex radio-frequency TDMA radio having receive signals communicated in contiguously arranged packets, a radio controller arrangement for controlling communication signal timing, comprising:
   a TDMA timer generating a receive timing signal;
   a radio-frequency receiver; and
   a microprocessor circuit including at least one processor and a program instruction set arranged to be accessed and executed by the processor to command the TDMA timer to
      activate the radio-frequency receiver,
      synchronize a beginning of a data collection operation to a synchronization field of a packet received by the radio-frequency receiver,
      determine a beginning of a data field of the received packet as a function of an end of the synchronization field,
      collect data from the data field and detect an end of the data field, and
      command deactivation of the radio-frequency receiver after detecting the end of the data field.

2. A radio controller arrangement, according to claim 1, further comprising a memory for storing the program instruction set.

3. A radio controller arrangement, according to claim 1, further comprising a memory, configured and arranged to store sets of radio signal level data.

4. A radio controller arrangement, according to claim 3, further comprising a latching arrangement, configured and arranged to store one of the sets of radio signal level data.

5. A radio controller arrangement, according to claim 3, wherein the radio controller arrangement is configured and arranged to generate an output signal as a function of a set of radio signal level data.

6. A radio controller arrangement, according to claim 3, wherein the memory comprises a portion configured and arranged to maintain an idle state on a time slot.

7. A radio controller arrangement, according to claim 6, further comprising a counter, operatively coupled to the portion and configured and arranged to count sets of radio signal level data retrieved from the portion.

8. A communication device, comprising:
   a TDMA timing circuit generating a receive timing signal;
   a radio-frequency receiver; and
   a microprocessor circuit including a microprocessor and a program instruction set arranged to be accessed and executed by the microprocessor to command the TDMA timing circuit to
      respond to the received timing signal by activating the radio-frequency receiver,
      synchronize a beginning of a data collection operation to a synchronization field of a packet received by the radio-frequency receiver,
      determine a beginning of a data field of the received packet as a function of an end of the synchronization field,
      collect data from the data field at least until an end of the data field is detected, and
      respond to detecting the end of the data field by commanding deactivation of the radio-frequency receiver.

9. A communication device, according to claim 8, further comprising a memory for storing the program instruction set.

10. A communication device, according to claim 8, further comprising a memory, configured and arranged to store sets of radio signal level data.

11. A communication device, according to claim 10, further comprising a latching arrangement, configured and arranged to store one of the sets of radio signal level data.

12. A communication device, according to claim 10, wherein the radio controller arrangement is configured and arranged to generate an output signal as a function of a set of radio signal level data.

13. A communication device, according to claim 10, wherein the memory comprises a portion, configured and arranged to maintain an idle state on a time slot.

14. A communication device, according to claim 13, further comprising a counter, configured and arranged to count sets of radio signal level data retrieved from the portion.

15. For use in a duplex radio-frequency TDMA radio having receive signals communicated in contiguously arranged packets, a method for controlling communication signal timing, the method comprising:
   using a TDMA timing circuit to generate receive timing signals;
   activating a radio-frequency receiver in response to the receive timing signal;
   synchronizing a beginning of a data collection operation of the TDMA timing circuit to a synchronization field of a packet received by the radio-frequency receiver;
   using the TDMA timing circuit to determine a beginning of a data field of the received packet as a function of an end of the synchronization field;
   using the TDMA timing circuit to collect data from the data field at least until an end of the data field is detected; and responding to detecting the end of the data field by commanding deactivation of the radio-frequency receiver.

16. A method for controlling communication signal timing, according to claim 15, further comprising storing a program instruction set in a memory.

17. A method for controlling communication signal timing, according to claim 15, further comprising storing sets of radio signal level data in a memory.

18. A method for controlling communication signal timing, according to claim 17, further comprising generating an output signal as a function of a set of radio signal level data.

19. A method for controlling communication signal timing, according to claim 15, further comprising maintaining an idle state on a time slot using a portion of a memory.

20. A method for controlling communication signal timing, according to claim 19, further comprising maintaining a count of sets of data retrieved from the portion of the memory.

21. For use in a duplex radio-frequency TDMA radio having receive signals communicated in contiguously arranged packets, a microprocessor arrangement for controlling communication signal timing, comprising:

at least one processor; and a program instruction set arranged to be accessed and executed by the processor to command the TDMA timing circuit to activate the radio-frequency receiver, synchronize a beginning of a data collection operation to a synchronization field of a packet received by the radio-frequency receiver, determine a beginning of a data field of the received packet as a function of an end of the synchronization field, collect data from the data field and detect an end of the data field, and command deactivation of the radio-frequency receiver after detecting the end of the data field.

22. For use in a duplex radio-frequency TDMA radio having receive signals communicated in contiguously arranged packets, a radio controller arrangement for controlling communication signal timing, comprising:

means for generating receive timing signals;

means for activating a radio-frequency receiver in response to the receive timing signal;

means for synchronizing a beginning of a data collection operation to a synchronization field of a packet received by the radio-frequency receiver;

means for determining a beginning of a data field of the received packet as a function of an end of the synchronization field;

means for collecting data from the data field at least until an end of the data field is detected; and means for responding to detecting the end of the data field by commanding deactivation of the radio-frequency receiver.

23. For use in a duplex radio-frequency TDMA radio having receive signals communicated in contiguously arranged packets, a radio controller arrangement for controlling communication signal timing, comprising:

a timing signal generator, configured and arranged to generate a receive timing signal;

a receiver activator, configured and arranged to activate a radio-frequency receiver in response to the receive timing signal;

a synchronizer, configured and arranged to synchronize a beginning of a data collection operation of the timing signal generator to a synchronization field of a packet received by the radio-frequency receiver;

a data collector, configured and arranged to determine a beginning of a data field of the received packet as a function of an end of the synchronization field, collect data from the data field at least until an end of the data field is detected, and command deactivation of the radio-frequency receiver after detecting the end of the data field.

* * * * *